(12) United States Patent
O'Meara

(10) Patent No.: US 12,031,543 B2
(45) Date of Patent: Jul. 9, 2024

(54) FOIL BEARING AND DRIVESHAFT ASSEMBLIES AND COMPRESSOR INCLUDING SAME

(71) Applicant: Copeland LP, Sidney, OH (US)

(72) Inventor: Patrick Shawn O'Meara, Tipp City, OH (US)

(73) Assignee: Copeland LP, Sidney, OH (US)

( * ) Notice: Subject to any disclaimer, the term of this patent is extended or adjusted under 35 U.S.C. 154(b) by 74 days.

(21) Appl. No.: 18/056,218

(22) Filed: Nov. 16, 2022

(65) Prior Publication Data

US 2024/0159244 A1    May 16, 2024

(51) Int. Cl.
| | |
|---|---|
| F04D 29/00 | (2006.01) |
| F04D 29/053 | (2006.01) |
| F04D 29/056 | (2006.01) |
| F04D 29/42 | (2006.01) |
| F04D 29/62 | (2006.01) |
| F16C 17/02 | (2006.01) |

(52) U.S. Cl.
CPC ......... *F04D 29/056* (2013.01); *F04D 29/053* (2013.01); *F04D 29/4206* (2013.01); *F04D 29/624* (2013.01); *F16C 17/024* (2013.01); *F16C 2360/00* (2013.01)

(58) Field of Classification Search
CPC .. F04D 29/056; F04D 29/053; F04D 29/4206; F04D 29/624; F04D 29/046; F04D 29/047; F04D 29/0473; F04D 29/0476; F04D 29/057; F16C 17/024; F16C 2360/00; F16C 17/028; F16C 33/1005; F16C 33/101; F16C 33/1015; F16C 27/02; F16C 2360/43–45

USPC .................................................. 415/122.1
See application file for complete search history.

(56) References Cited

U.S. PATENT DOCUMENTS

| | | | |
|---|---|---|---|
| 3,981,627 A | 9/1976 | Kantor | |
| 4,808,070 A | 2/1989 | Fonda | |
| 6,368,225 B1 * | 4/2002 | Breese | F16C 3/03 |
| | | | 285/382.2 |
| 8,083,413 B2 | 12/2011 | Ertas | |
| 10,247,017 B2 | 4/2019 | Miller et al. | |
| 10,774,873 B2 | 9/2020 | Jeung et al. | |
| 2003/0169951 A1 | 9/2003 | Nishijima et al. | |

(Continued)

FOREIGN PATENT DOCUMENTS

| | | |
|---|---|---|
| CN | 114909319 A | 8/2022 |
| DE | 202018105842 U1 | 11/2018 |
| WO | 2022022100 A1 | 2/2022 |

OTHER PUBLICATIONS

International Search Report and Written Opinion issued by the International Searching Authority in Application Serial No. PCT/US2023/079623 dated Feb. 13, 2024, pp. 1-17.

*Primary Examiner* — Kenneth J Hansen
*Assistant Examiner* — Kelsey L Stanek
(74) *Attorney, Agent, or Firm* — Armstrong Teasdale LLP

(57) ABSTRACT

A bearing system including a foil bearing assembly positioned within the cylindrical bore of the sleeve. The foil bearing includes a top foil layer and an outer layer. The bearing system includes a driveshaft including a recess axially aligned with the top foil layer. The recess defines a cavity having a volume and includes a leading end at a first circumferential position and a trailing end at a second circumferential position. The volume of the cavity decreases from the leading end to the trailing end.

19 Claims, 11 Drawing Sheets

(56) References Cited

U.S. PATENT DOCUMENTS

| | | | |
|---|---|---|---|
| 2007/0292268 A1* | 12/2007 | Nishiyama | F04D 29/266 |
| | | | 415/230 |
| 2011/0194960 A1 | 8/2011 | Wu et al. | |
| 2015/0362012 A1 | 12/2015 | Ermilov | |
| 2020/0256347 A1* | 8/2020 | Groshek | F04D 29/584 |
| 2020/0332830 A1* | 10/2020 | Choi | F16C 17/243 |
| 2020/0408245 A1 | 12/2020 | Jeung et al. | |
| 2022/0065513 A1* | 3/2022 | Oakley | F04D 27/001 |
| 2022/0243762 A1* | 8/2022 | Liu | F16C 43/02 |

\* cited by examiner ant outer layer positioned between the top foil layer and the radial inner surface. The bearing system includes a driveshaft including a recess axially aligned with the top foil layer. The recess defines a cavity having a volume and includes a leading end at a first circumferential position and a trailing end at a second circumferential position. The volume of the cavity decreases from the leading end to the trailing end.

In yet another aspect, a method of assembling a compressor including a compressor housing includes mounting a bearing housing to the compressor housing. The bearing housing including a sleeve having a radial inner surface defining a cylindrical bore. The method includes inserting an outer layer within the cylindrical bore and inserting a top foil within the outer layer, such that the outer layer positioned between the cylindrical bore and the top foil. The method includes inserting a driveshaft within the top foil such that the driveshaft is rotatably supported within the compressor housing, the driveshaft including a recess axially aligned with the top foil layer. The recess defines a cavity having a volume and includes a leading end at a first circumferential position and a trailing end at a second circumferential position. The volume of the cavity decreases from the leading end to the trailing end.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

FOIL BEARING AND DRIVESHAFT ASSEMBLIES AND COMPRESSOR INCLUDING SAME

FIELD

The field relates generally to bearings and compressors, and more particularly, to foil bearing and driveshaft assemblies for use in compressors.

BACKGROUND

Centrifugal compressors used in refrigeration and cooling systems, may include foil bearings to support a driveshaft used to transfer power from a motor to an impeller that imparts kinetic energy to incoming refrigerant. Generally, foil bearings are well-suited for the high-speed operating environment typical of centrifugal compressors, are compatible with all refrigerant compositions, and may be used with a wider variety of driveshaft materials, thereby permitting the use of lighter-weight materials to reduce the amount of energy needed to operate the compressor.

Conventionally, foil bearings include compliant foil elements surrounding the driveshaft. The foil bearing supports the driveshaft on a pressure profile of lubricating fluid, for example, air and/or refrigerant, that builds up between the driveshaft and foil elements formed by rotations of the driveshaft. When the driveshaft reaches a sufficient speed, termed liftoff speed, the pressure profile of lubricating fluid may create a complete radial separation between the driveshaft and the foil elements. However, when the driveshaft is rotating at speeds below the liftoff speed, generally during startup and shut down of a refrigeration cycle, the pressure profile may not be completely developed, causing frictional engagement between the driveshaft and the foil elements, potentially resulting in wear and/or failure. Accordingly, there exists a need to improve the performance of foil bearings, particularly at lower driveshaft rotational speeds.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a bearing system includes a sleeve having a radial inner surface defining a cylindrical bore with a foil bearing assembly positioned within the cylindrical bore. The foil bearing includes a top foil layer and an outer layer positioned between the top foil layer and the radial inner surface. The bearing system includes a driveshaft including a recess axially aligned with the top foil layer. The recess defines a cavity having a volume and includes a leading end at a first circumferential position and a trailing end at a second circumferential position. The volume of the cavity decreases from the leading end to the trailing end.

In another aspect, a compressor includes a compressor housing, a bearing housing mounted to the compressor housing, and a bearing system. The bearing system includes a sleeve having a radial inner surface defining a cylindrical bore with a foil bearing assembly positioned within the cylindrical bore. The foil bearing includes a top foil layer

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
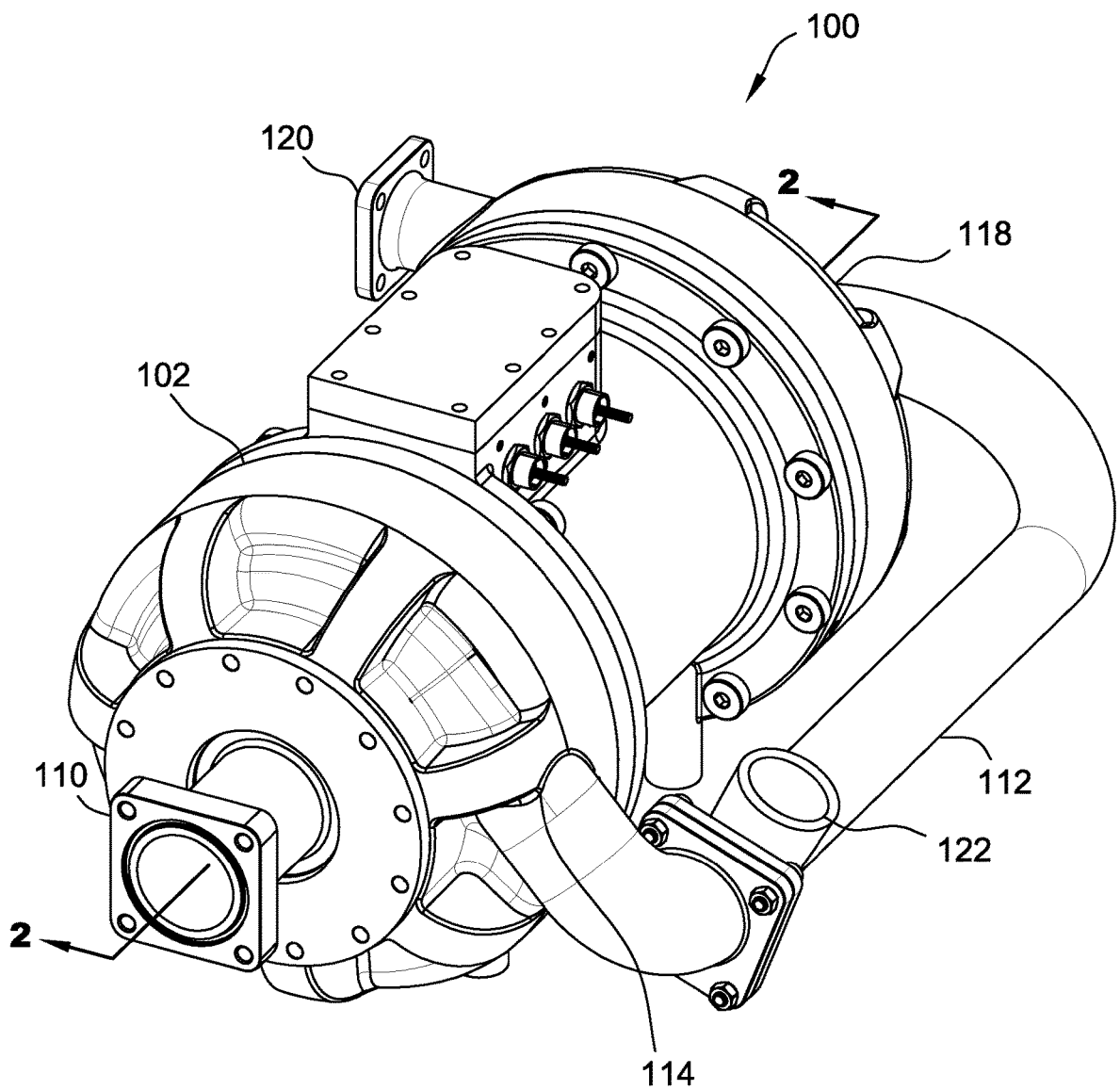
FIG. 1 is a perspective view of an assembled compressor.

Referring to FIG. 1, a compressor in the form of a two-stage refrigerant compressor is indicated generally at 100. The compressor 100 generally includes a compressor housing 102 forming at least one sealed cavity within which each stage of refrigerant compression is accomplished. The compressor 100 includes a first refrigerant inlet 110 to introduce refrigerant vapor into the first compression stage (not labeled in FIG. 1), a first refrigerant exit 114, a refrigerant transfer conduit 112 to transfer compressed refrigerant from the first compression stage to the second compression stage, a second refrigerant inlet 118 to introduce refrigerant vapor into the second compression stage (not labeled in FIG. 1), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated. The refrigerant transfer conduit 112 may further include a refrigerant port 122, for example, for economization.

Figure 2:
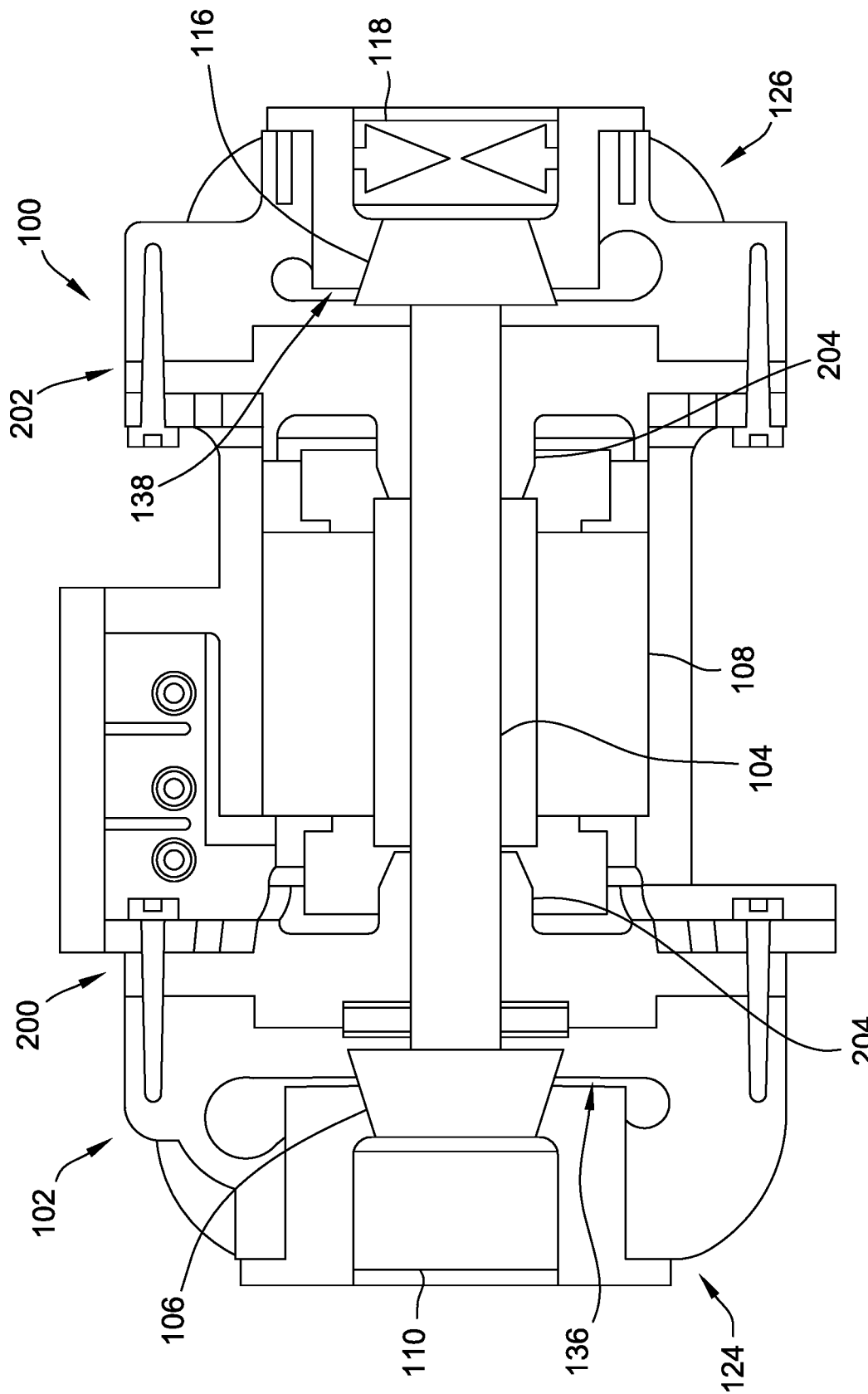
FIG. 2 is a cross-sectional view of the compressor of FIG. 1 taken along line 2-2, with the external conduit removed.

Referring to FIG. 2, the compressor housing 102 encloses a first compression stage 124 and a second compression stage 126 at opposite ends of the compressor 100. The first compression stage 124 includes a first impeller 106 configured to add kinetic energy to refrigerant entering via the first refrigerant inlet 110. The kinetic energy imparted to the refrigerant by the first impeller 106 is converted to increased refrigerant pressure (i.e., compression) as the refrigerant velocity is slowed upon transfer to a diffuser 136. Similarly, the second compression stage 126 includes a second impeller 116 configured to add kinetic energy to refrigerant transferred from the first compression stage 124 entering via the second refrigerant inlet 118. The kinetic energy imparted to the refrigerant by the second impeller 116 is converted to increased refrigerant pressure (i.e., compression) as the refrigerant velocity is slowed upon transfer to a diffuser 138. Compressed refrigerant exits the second compression stage 126 via the second refrigerant exit 120 (not shown in FIG. 2).

Figure 3:
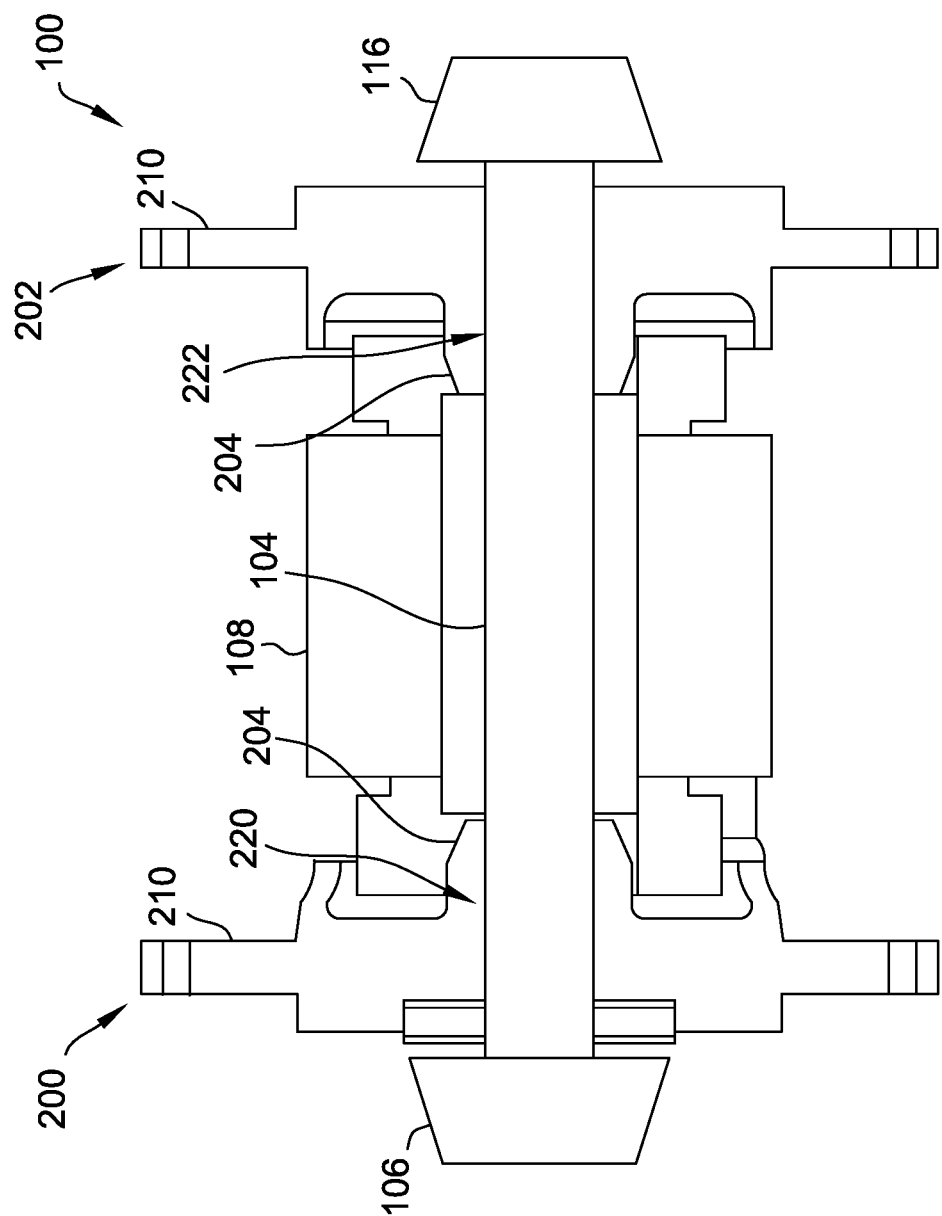
FIG. 3 is a cross-sectional view of the compressor of FIG. 2 with the external compressor housing removed.

Referring to FIG. 2 and FIG. 3, the first stage impeller 106 and second stage impeller 116 are connected at opposite ends of a driveshaft 104. The driveshaft 104 is operatively connected to a motor 108 positioned between the first stage impeller 106 and second stage impeller 116 such that the first stage impeller 106 and second stage impeller 116 are rotated at a rotation speed selected to compress the refrigerant to a pre-selected pressure exiting the second refrigerant exit 120. Any suitable motor may be incorporated into the compressor 100 including, but not limited to, an electric motor.

Figure 4:
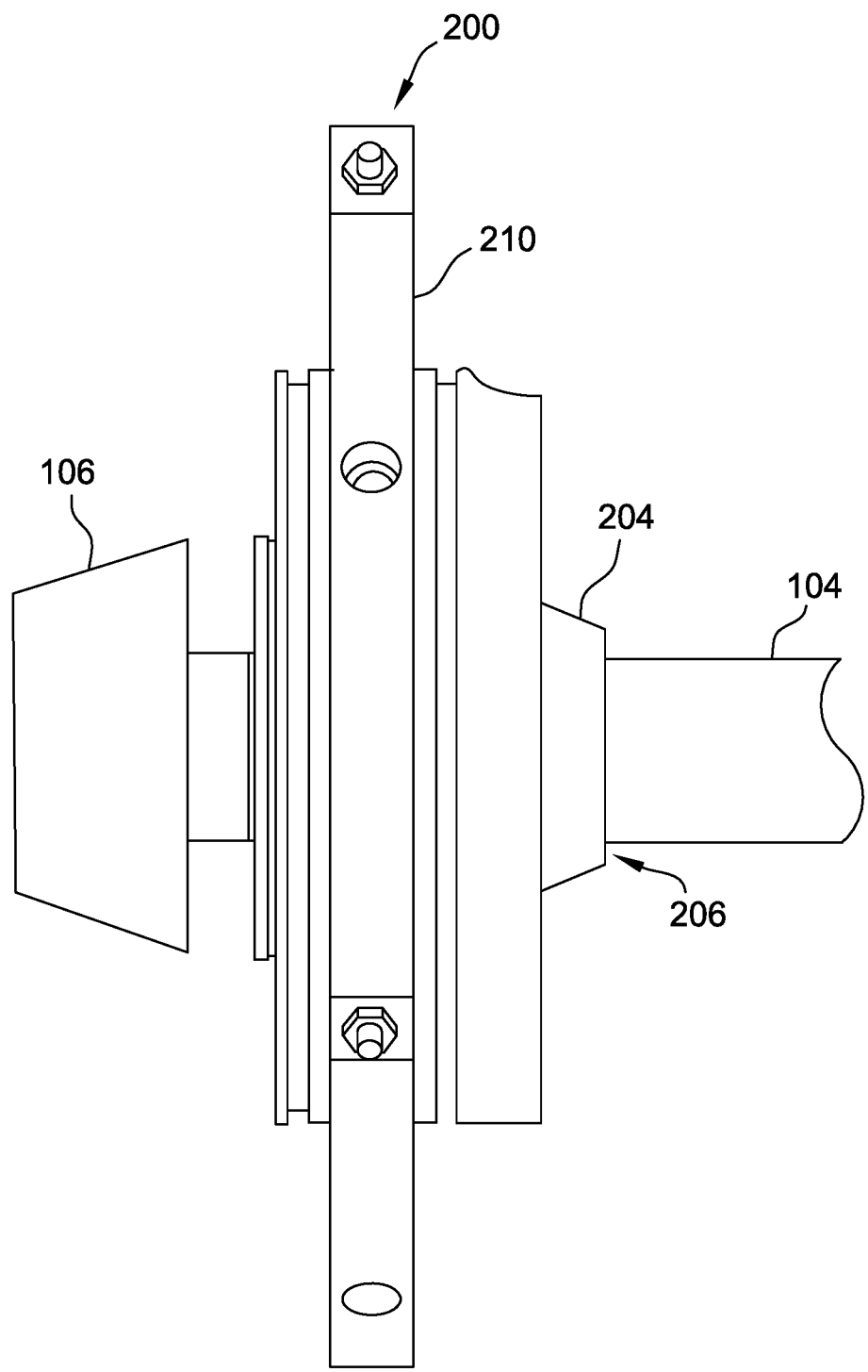
FIG. 4 is a side view of an impeller mounted to an end of a driveshaft in which the driveshaft is supported by a bearing housing.

Referring to FIG. 3 and FIG. 4, the driveshaft 104 is supported by a first foil bearing assembly 220 and a second foil bearing assembly 222 positioned within a sleeve 204 of a first and second bearing housings 200, 202, respectively. In particular, the sleeve 204 includes a radial inner surface defining a cylindrical bore 206 and the first and second foil bearing assemblies 220, 222 are positioned within the cylindrical bore 206. Each of the first and second bearing housings 200, 202 includes a mounting structure 210 for connecting the respective first and second bearing housings 200, 202 to the compressor housing 102. Each bearing housing 200, 202 (only bearing housing 200 illustrated in FIG. 4) supports the driveshaft 104, and the driveshaft 104 projects through the bearing housing 200, 202 opposite the sleeve 204, and the impellers 106, 116 are connected to the projecting ends of the driveshaft 104.

Figure 5:
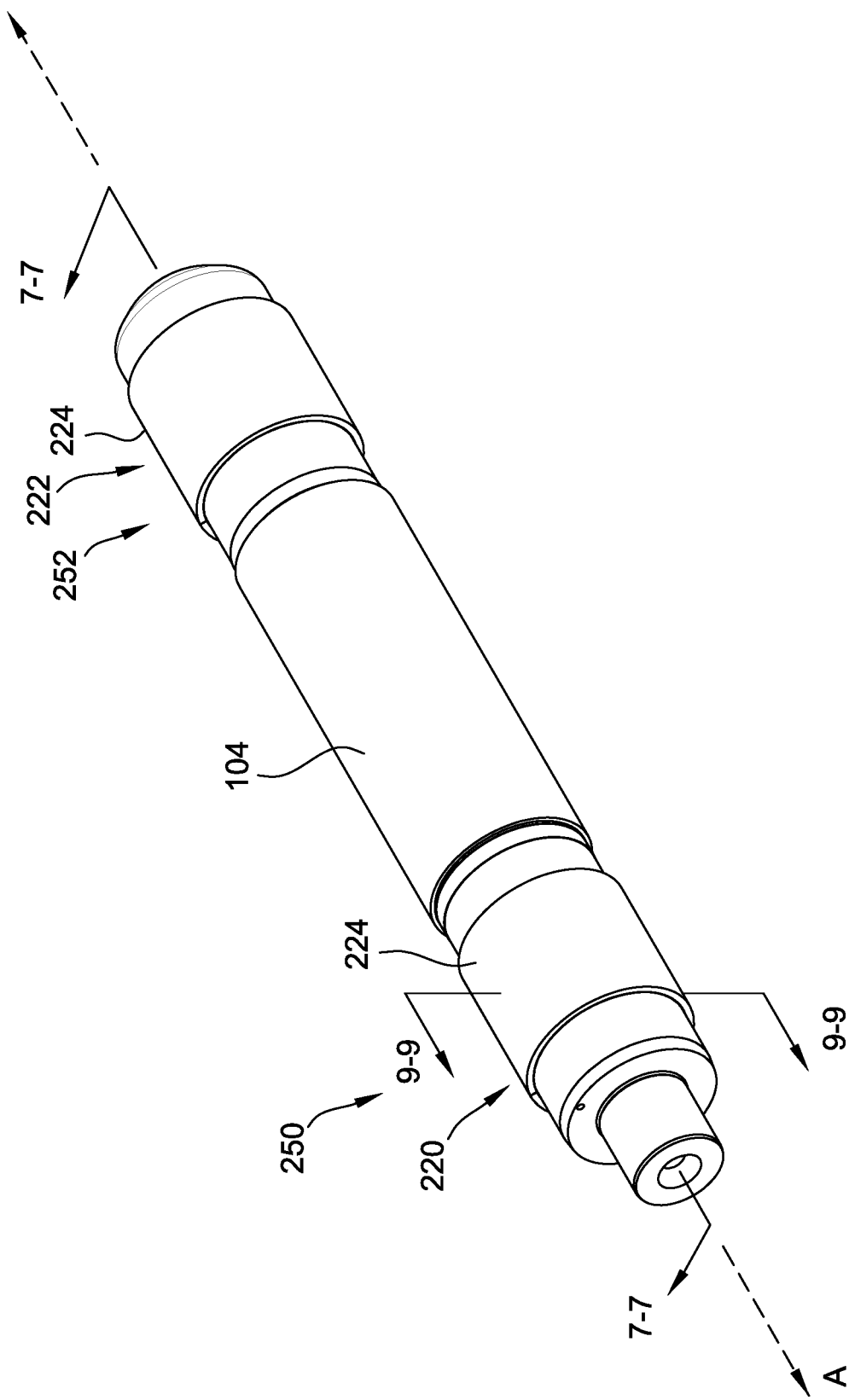
FIG. 5 is a perspective view of a driveshaft and a first and second foil bearing assemblies for use with the compressor shown in FIG. 1.
Figure 6:
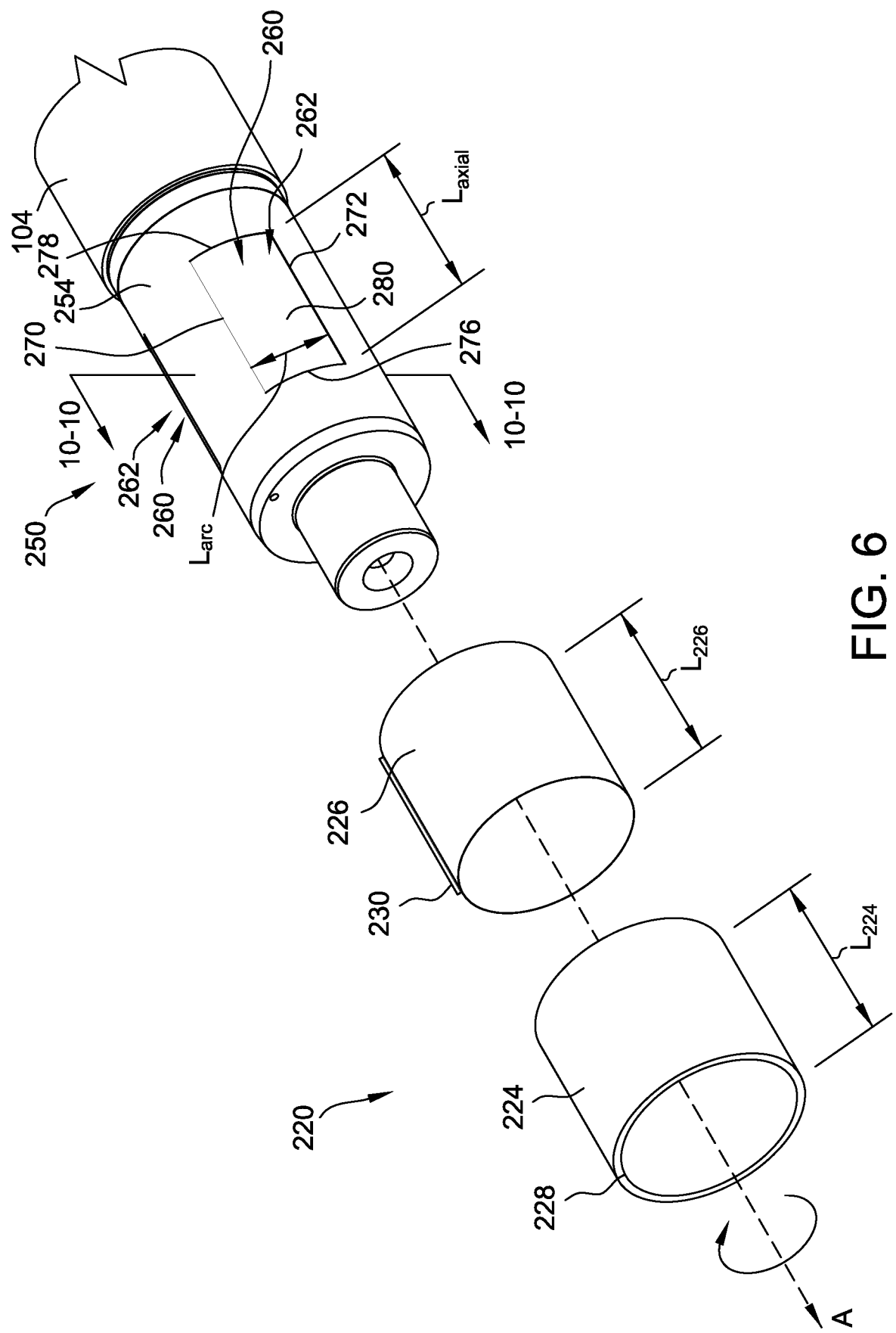
FIG. 6 is an exploded view of a portion of the driveshaft, showing the arrangement of the first foil bearing assembly with respect to the driveshaft.

Referring to FIGS. 5 and 6, the first and second foil bearing assemblies 220, 222 include an outer compliant assembly or outer layer 224 positioned adjacent to the radial inner surface of the sleeve 204 and an inner compliant foil assembly or inner foil layer 226, visible in FIG. 6, (also referred to as a "top foil layer") positioned adjacent to the driveshaft 104. The first and second foil bearing assemblies 220, 222 including the outer layer 224 and the top foil layer 226 form an essentially cylindrical tube sized to receive the driveshaft 104. The components of the foil bearing assemblies 220, 222, such as outer layer 224 and/or the top foil layer 226, may be constructed of any suitable material that enables the foil bearing assemblies 220, 222 to function as described herein. Suitable materials include, for example and without limitation, metal alloys. In some embodiments, for example, each of the outer layer 224 and the top foil layer 226 are constructed of stainless steel (e.g., 17-4 stainless steel). The top foil layer 226 can be formed from relatively thin sheets or "foils" of material. For example, the foil layer 226 can be constructed of metal sheets having a thickness in the range of 0.003 inches to 0.007 inches. In some embodiments, the first and second foil bearing assemblies 220, 222 include a bump foil layer, not shown, disposed between the outer layer 224 and the top foil layer 226. The bump foil layer, having a series of corrugations, acts as a biasing mechanism between the top foil 226 and the outer layer 224. In the illustrated embodiment, the foil bearing assemblies 220 and 222 do not include a bump foil layer. The outer layer 224 may be composed of a compliant material and acts as a biasing mechanism between the top foil layer 226 and the radial inner surface of the sleeve 204. The outer layer 224 may be composed of polyvinyl chloride (PVC). In other embodiments, the outer layer 224 may be composed of any suitable material. The outer layer 224 may include a groove 228 sized and shaped to receive a retention feature 230 on the top foil layer 226. Engagement of the retention feature 230 with groove 228 connects the top foil layer 22 with the outer layer 224.

Figure 7:
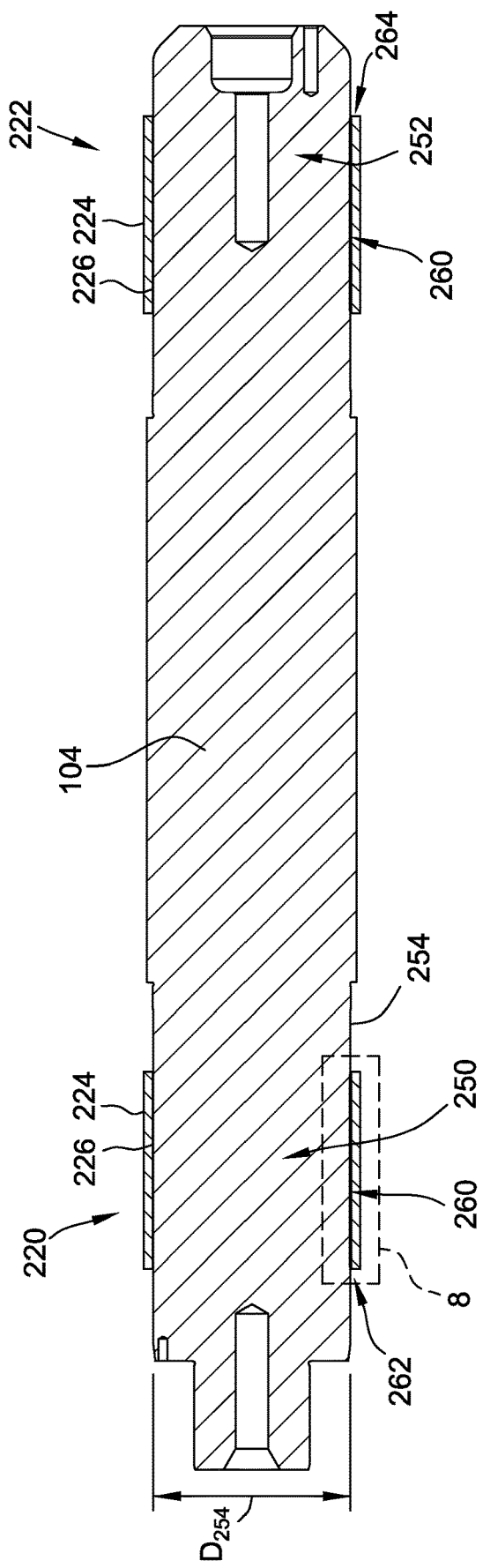
FIG. 7 is a cross-sectional view of the driveshaft and first and second foil bearings of FIG. 5 along line 7-7.

Referring to FIGS. 5-7, the driveshaft 104 includes a first bearing portion 250 arranged in proximity to the first impeller 106. The first bearing portion 250 is axially aligned with the first foil bearing assembly 220. The driveshaft 104 includes a second bearing portion 252 arranged in proximity to the second impeller 116, the second bearing portion 252 is axially aligned with the second foil bearing assembly 222. The driveshaft 104 further includes a driveshaft longitudinal axis A extending between the first and second bearing portions 250, 252. The motor 108 rotates the driveshaft 104 about the longitudinal axis A. An axial direction is directed along the longitudinal axis A and a radial direction extends radially outward and/or perpendicular to the axial direction. The driveshaft 104 is cylindrical in shape including an outer surface 254 that extends about a circumference of the driveshaft 104. The driveshaft 104 includes a diameter $D_{254}$ defined by the outer surface 254. In the illustrated embodiments, the driveshaft 104 includes one or more stepped portions having a different diameter than the outer diameter $D_{254}$. Generally, the diameter $D_{254}$ is the diameter of the first bearing portion 250 and the second bearing portion 252.

During refrigerant compression, rotations of the driveshaft 104 cause the top foil layer 226 to move radially outward away from the driveshaft 104 caused by hydrodynamic pressure induced by the buildup of a pressure profile of a lubricating fluid layer surrounding the circumference of the driveshaft 104. The lubricating fluid may include any medium, such as air or refrigerant, or a mixture of air and refrigerant, that enables rotations of the driveshaft 104. When the driveshaft 104 is rotating at sufficient rotational speeds, the pressure of the lubricating fluid layer is sufficient to create a complete radial separation between the top foil layer 226 and the driveshaft 104, e.g., there is no contact between the driveshaft 104 and the top foil layer 226. Likewise, at "lower" rotational speeds, the top foil layer 226 may be radially closer to the driveshaft 104 and the lubricating fluid layer may be thin, and/or negligible, and in some instances, the top foil layer 226 or a portion of the top foil layer 226 may be in contact with the driveshaft 104.

Figure 8:
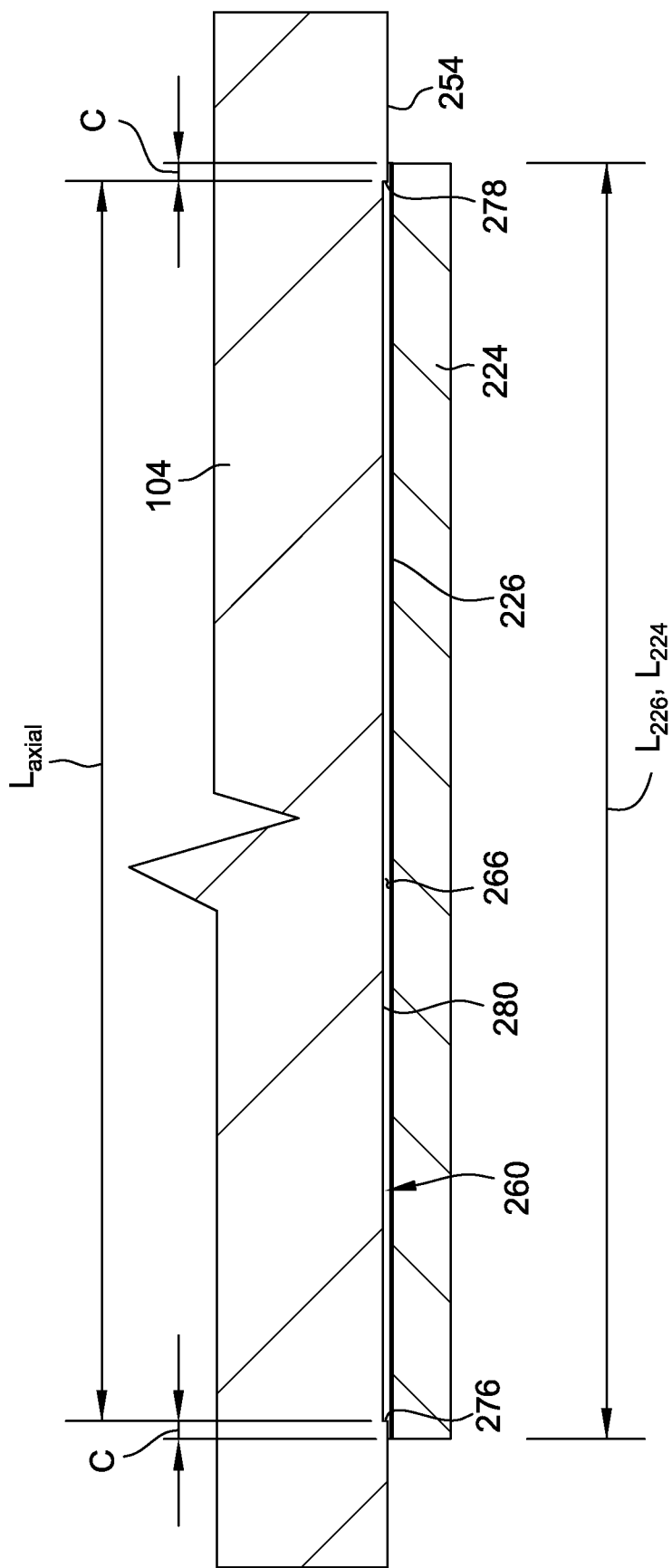
FIG. 8 is a detailed view of region 8 shown in FIG. 7.
Figure 9:
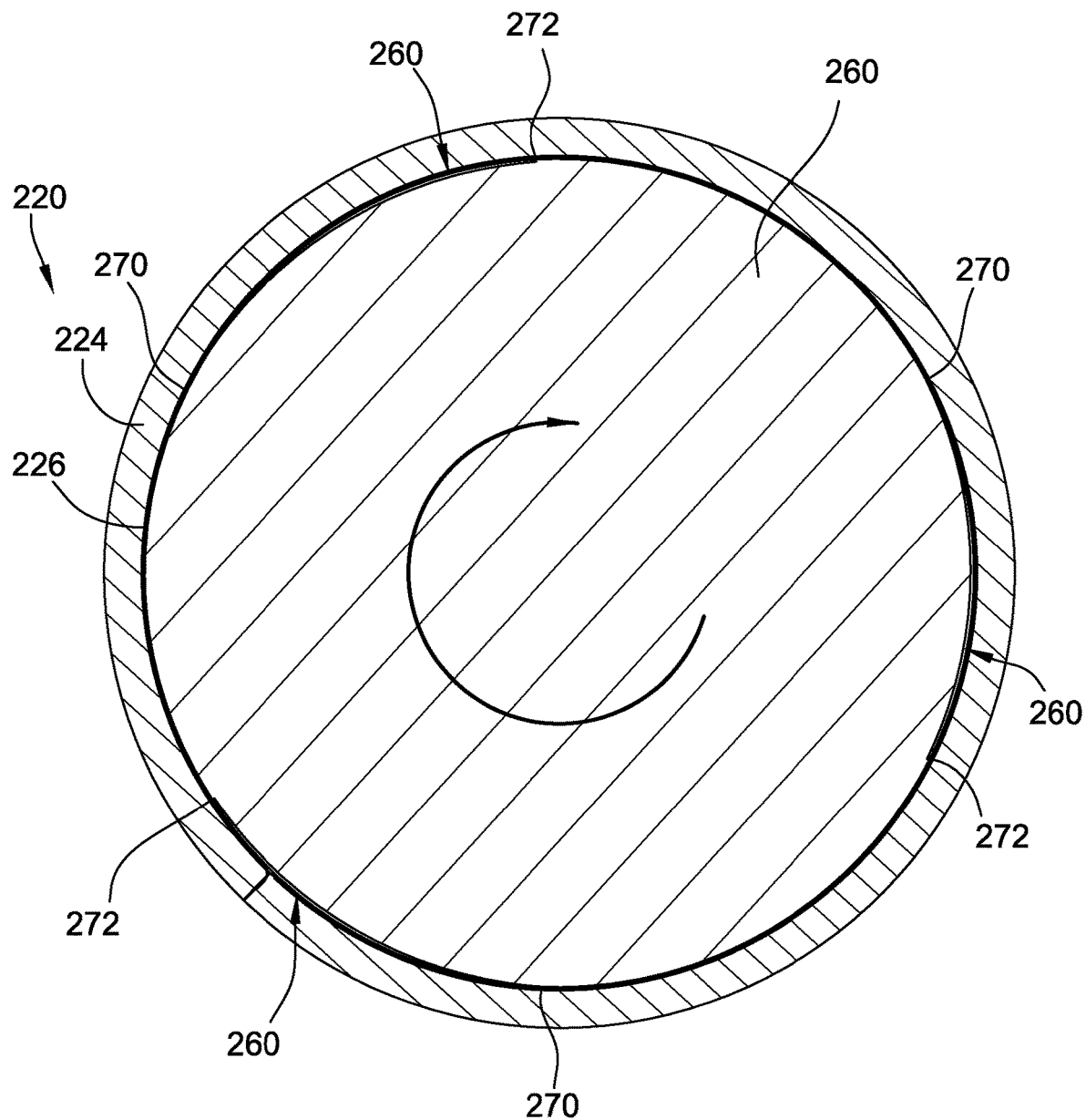
FIG. 9 is a cross-sectional view of the driveshaft and the first foil bearing assembly of FIG. 5 along line 9-9.

Referring to FIGS. 6-8, the driveshaft 104 includes one or more recesses 260 formed, e.g., machined, thereon. The recess 260 may be axially aligned with either, or both, of the foil bearing assemblies 220 and 222. Each of the recesses 260 defines the boundary of a cavity 266. A volume of fluid, e.g., a gas including air and/or refrigerant, may be contained within the cavity 266 and radially inward from the top foil layer 226 at any rotational speed of the driveshaft 104. For example, the cavity 266 may contain a volume of fluid during a startup phase of refrigerant compression, e.g., when the driveshaft 104 is not yet rotating or the driveshaft 104 is rotating at low rotational speeds, e.g., less than 5,000 rpm. In addition, a volume of fluid may be contained within the cavity 266 and radially inward from the top foil layer 226, prior to a liftoff speed of the driveshaft 104. In general, a liftoff speed is a speed at which a layer of the fluid develops around the entire circumference of the driveshaft 104. The driveshaft 104 having one or more recesses 260 may develop a complete pressure profile of lubricating fluid between the driveshaft 104 and the top foil layer 226 at a lower liftoff speed, e.g., below 30,000 rpm, as compared to driveshafts that do not include the recesses 260.

The recesses 260 may be tapered, e.g., decreasing in width and/or depth, such that a volume of the cavity 266 decreases towards one end of the recess 260. The fluid, contained within the cavity 266, and/or surrounding the driveshaft 104, may be generally stationary and/or moving opposite to the direction of rotation of the driveshaft 104, such that the fluid has an opposite relative motion compared to the rotational direction of the driveshaft 104. Accordingly, the fluid moves towards the tapered end of the recess 260. The fluid moving into the tapered cavity 266 compresses the fluid and increases the pressure of the fluid. The increase in the fluid pressure, presses the top foil layer 226 radially outward, away from the driveshaft 104, encouraging the development of a complete fluid layer to form around the entire circumference of the driveshaft 104. The volume of fluid contained in the cavity 266, defined by the recess 260, improves the startup and shutdown performance of the compressor 100. The recesses 260 also improve the performance, e.g., stability, of the driveshaft 104 and foil bearing assemblies 220 and 222 at higher driveshaft 104 rotational speeds, e.g., greater than 30,000 rpm, and/or greater than 50,000 rpm. Additionally, the driveshaft 104 including the tapered recesses 260 are suitable for use with foil bearing assemblies 220, 222 that do not include a bump foil layer.

In the illustrated embodiment, the first bearing portion 250 includes a first set 262 of the recesses 260 formed thereon that are axially aligned with the first foil bearing assembly 220 and the second bearing portion 252 includes a second set 264 of the recesses 260 formed thereon and axially aligned with the second foil bearing assembly 222.

Referring to FIG. 6, each of the recesses 260 includes a leading end 272 arranged at a first radial position and a trailing end 270 arranged at a second radial position that is circumferentially offset from the leading end 272. The leading and trailing ends 272, 270 of the recess 260 may include a wall and/or a surface that at least partially defines the boundary of the cavity 266. The leading end 272 is arranged forward of the trailing end 270 with respect to the rotational direction of the driveshaft 104. For example, if the driveshaft 104 rotates clockwise, the leading end 272 is arranged clockwise relative to the trailing end 270. Likewise, if the driveshaft 104 rotates counter-clockwise, the leading end 272 is arranged counter-clockwise relative to the trailing end 270. Each of the recesses 260 includes a recess arc length $L_{arc}$ extending between the leading end 272 and the trailing end 270. The recesses 260 includes a recess arc angle $\alpha_{260}$ between the leading end 272 and the trailing end 270. See FIG. 10.

The recesses 260 include a first axial end 276 and a second axial end 278 axially offset from the first axial end 276, e.g., a wall and/or a surface that at least partially defines the boundary of the cavity 266. The recesses 260 include an axial length $L_{axial}$ extending between the first axial end 276 and second axial end 278. In some embodiments, the first axial end 276 and the second axial end 278 are parallel. In some embodiments, the first axial end 276 and the second axial end 278 are not parallel. The top foil layer 226 includes an axial length $L_{226}$ that is the same, or substantially the same, as an axial length $L_{224}$ of the outer layer 224. The axial length $L_{axial}$, of the recess 260, may be the same, or substantially the same, e.g., within 1-2 mm, as the axial length $L_{226}$ of the top foil layer 226. In the illustrated embodiment, the axial length $L_{axial}$, of the recess 260 is slightly less than axial length $L_{226}$, such that the top foil layer 226 extends axially beyond the first and second axial ends 276, 278, with a clearance C. See FIG. 8. The clearance C may be in a range of 1 to 6 mm.

The recesses 260 further include a base surface 280, recessed from the outer surface 254. The base surface 280 extends in the axial direction between the first and second axial ends 276, 278 and in the circumferential direction between the leading and trailing ends 272, 270. A depth $T_{260}$ of the recess 260 extends between the outer surface 254 of the driveshaft 104 and the base surface 280 of the recess 260. See FIG. 11. The depth $T_{260}$ of the recess 260 may be variable between the leading end 272 and the trailing end 270 such that the depth $T_{260}$ of the recess 260 changes in the radial direction between the leading end 272 and the trailing end 270. The depth $T_{260}$ of the recess 260, in the radial direction, may also be defined by a height of the first and second axial ends 276, 278, the height is variable in the radial direction.

Figure 11:
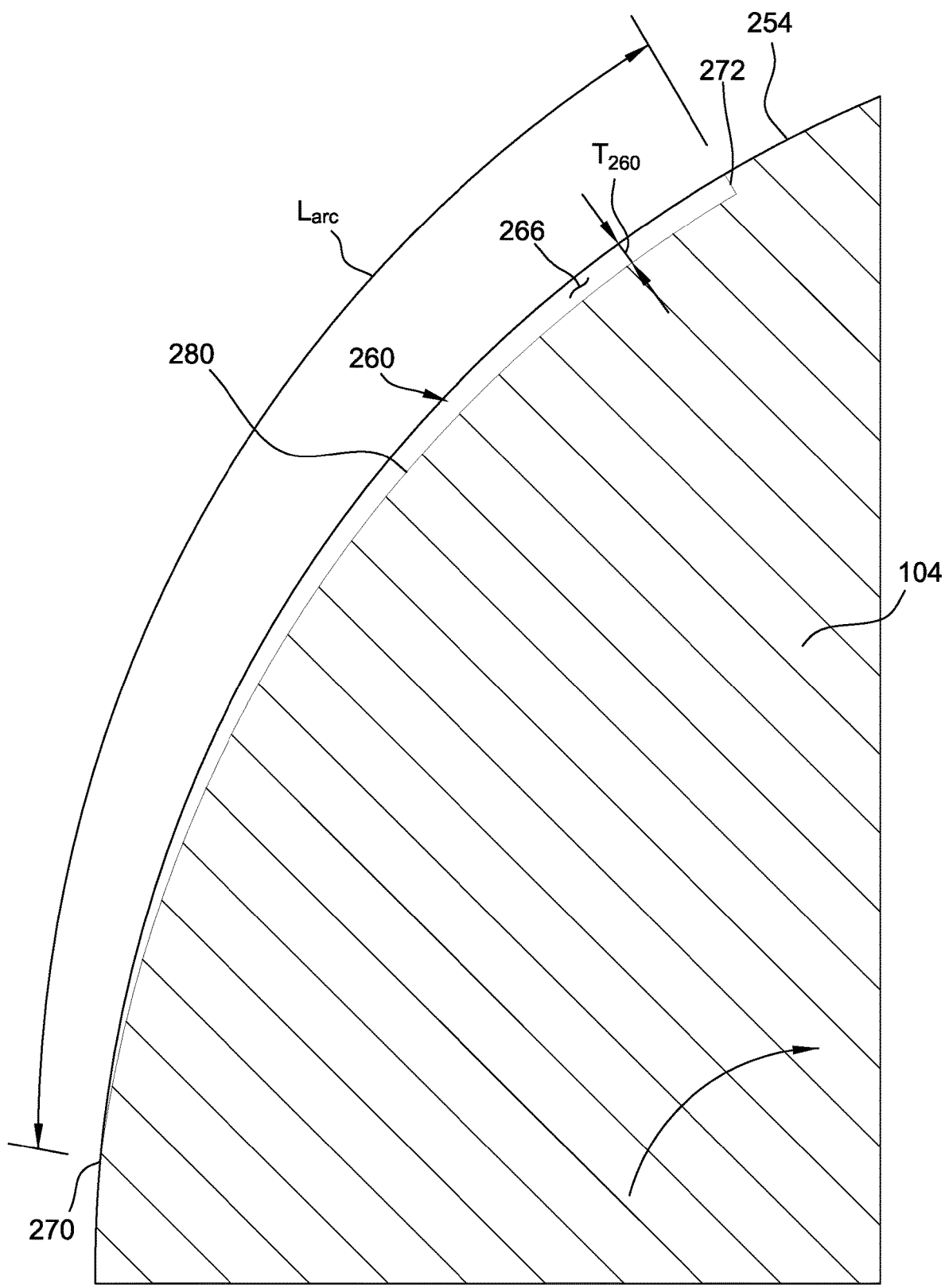
FIG. 11 is a detailed view of region 11 shown in FIG. 10.

Referring to FIG. 11, the depth $T_{260}$ of the recess 260 is largest near the leading end 272 and smallest near the trailing end 270. The depth $T_{260}$ at the leading end 272 is suitably between 0-1 mm. In some embodiments, the depth $T_{260}$ at the leading end 272 is suitably between 0.010 to 0.08 mm. In some embodiments, the depth $T_{260}$ at the leading end 272 is suitably between 0.013 to 0.076 mm. The depth $T_{260}$ of the recess 260 decreases from the leading end 272 to the trailing end 270, such that the depth $T_{260}$ of the recess 260 includes a peak depth $T_{260}$ located at the leading end 272. In this embodiment, the base surface 280 is arched. In some embodiments, a radius of curvature of the base surface 280 is less than a radius of curvature of the driveshaft 104. In some embodiments, a center curvature of the base surface 280 is not aligned with a center of curvature of the driveshaft 104. In some embodiments, the base surface 280 is arched and has a radius of curvature that is substantially the same as a radius of curvature of the driveshaft 104.

The trailing end 270 has a depth $T_{260}$ that is substantially zero, or approximately zero, or approaches zero. In some embodiments, the trailing end 270 has a depth $T_{260}$ of zero ±0.001 mm. For example, the depth $T_{260}$ at the trailing end 270 is negligible in either or both of the radial and axial directions. Accordingly, the trailing end 270 of the recess 260 does not have an abrupt change in the diameter $D_{254}$ of the driveshaft 104. The decreasing depth $T_{260}$ towards the trailing end 270 compresses the fluid contained within the cavity 266 and radially inward of the top foil layer 226, thereby increasing the pressure of the fluid. The gradual tapering may also produce a more laminar flow of the fluid surrounding the driveshaft 104. In the illustrated embodiment, the depth $T_{260}$ of the recess 260, along the axial direction between the first and second axial ends 276, 278, may be generally constant. For example, the depth $T_{260}$ of the recess 260 at the leading end 272 is generally constant along the axial length of the leading end 272.

In alternative embodiments, the depth $T_{260}$, in the radial direction, may be constant between the leading end 272 and trailing end 270. In such embodiments, the base surface 280 is arched. In some other alternative embodiments, the base surface 280 may be substantially planar extending along a chord, relative to the circumference of the driveshaft 104. For example, the base surface 280 may be generally perpendicular to the radial direction.

In another alternative embodiment, both the leading end 272 and the trailing end 270 may be flush with the outer surface 254 of the driveshaft 104. For example, the depth $T_{260}$ of the recess 260, in the radial and axial directions, at the leading end 272 and trailing end 270 may be zero, or substantially zero. Accordingly, the recess depth $T_{260}$, at both the leading end 272 and trailing end 270 do not have an abrupt change in the outer surface 254 of the driveshaft 104. In some other alternative embodiments, the depth $T_{260}$ may taper and/or slope from the leading end 272 and trailing end 270 to a radial mid-point, at which the recess depth $T_{260}$ is at a maximum. In alternative embodiments, the base surface 280 may be concave. In the alternative embodiment, the recess 260 includes a peak, e.g., largest, depth $T_{260}$ of the recess 260 that is located at the radial mid-point between the leading end 272 and the trailing end 270.

Referring again to FIG. 6, the leading end 272 and the trailing end 270 are linear, such that the leading end 272 and trailing end 270 extend parallel to each other and parallel to the longitudinal axis A. In this embodiment, the leading end 272 and trailing end 270 lengths may be substantially the same length, e.g., the axial length of both the leading end 272 and trailing end 270 is the axial length $L_{axial}$ of the recess 260.

Alternatively, an axial length of the leading end 272 may be different than an axial length of the trailing end 270. For example, an axial length of the leading end 272 may be greater than an axial length of the trailing end 270, such that the cavity 266 tapers towards the trailing end 270. Accordingly, in some embodiments, the recess 260 tapers from a wider leading end 272 to a narrower trailing end 270. Additionally, in some embodiments, the recess 260 tapers in both depth and in width from the leading end 272 to the trailing end 270. Additionally, in some alternative embodiments, the leading end 272 and/or the trailing end 270 may be arched, relative to the axial direction. In some embodiments, the leading end 272 is arched, between the first axial end 276 and the second axial end 278. For example, leading end 272 may be convex, extending forward towards the direction of rotation of the driveshaft 104.

Figure 10:
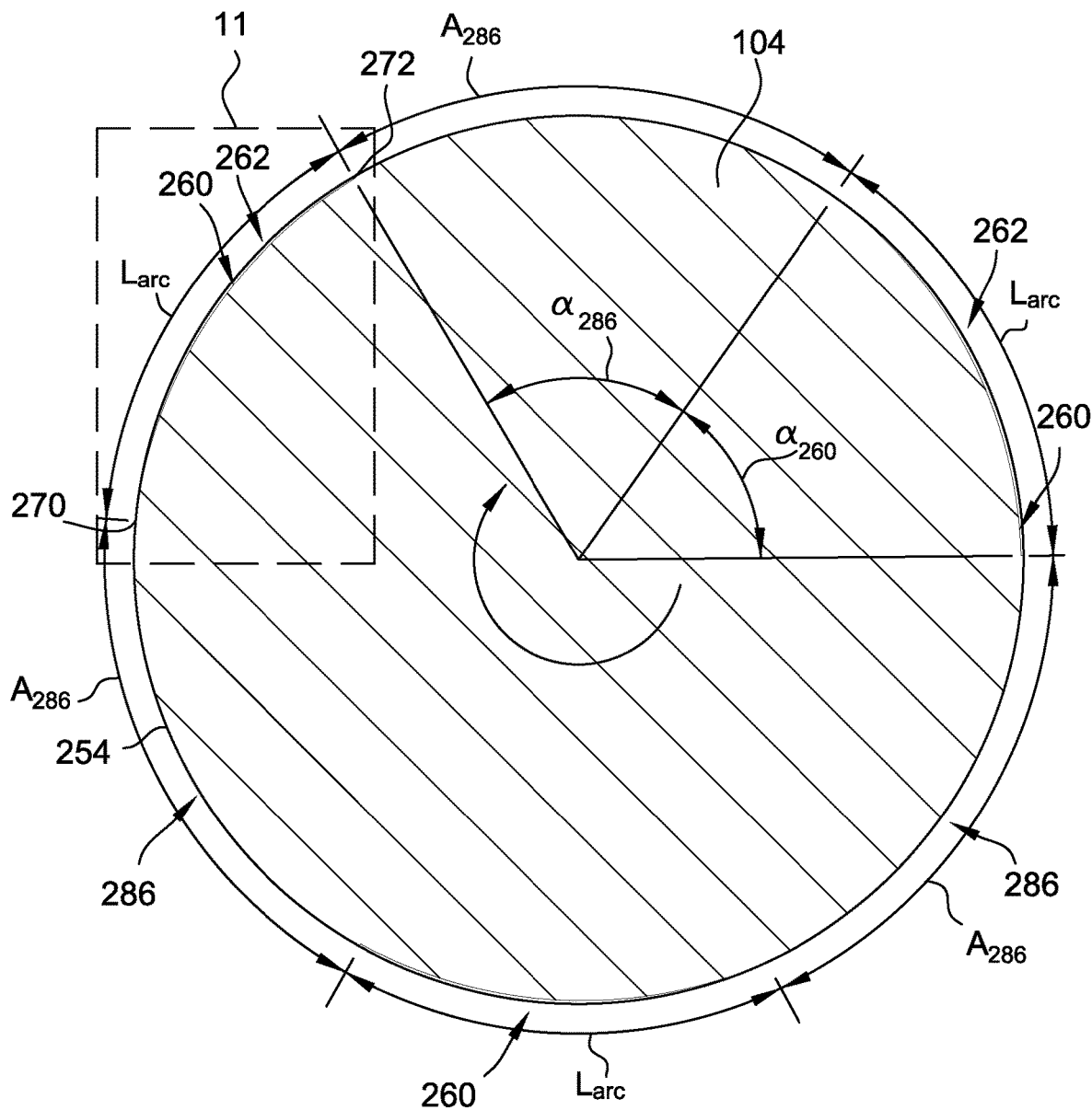
FIG. 10 is a cross-section view of the driveshaft of FIG. 6 along line 10-10.

Referring to FIG. 10, the first set 262 and the second set 264 of the recesses 260 includes any suitable number of recesses 260 arranged in any suitable pattern. In the illustrated embodiment, the first set 262 of the recesses 260 includes three recesses 260 that are arranged in a radially symmetric pattern about the axis A. In other words, the recess 260 are radially spaced an equal distance apart. In particular, the driveshaft 104 includes one or more spacing portions 286 extending between adjacent recesses 260. For example, the spacing portion 286 extends between the trailing end 270 of a first recess and the leading end 272 of a second recess, adjacent to the first recess. The spacing distance $A_{286}$ is a circumferential distance along the outer surface 254 of the driveshaft 104 having an arc length of $A_{286}$. The spacing portions 286 includes a spacing arc angle $\alpha_{286}$ spanning between the trailing end 270 of a first of recess 260 and the leading end 272 of an adjacent one of recess 260. The radially symmetric pattern of the first set 262 of recesses 260 is such that the spacing distance $A_{286}$ is substantially equal between each pair of adjacent recesses 260. In some embodiments, the arc angle $\alpha_{260}$ is between 50° and 60°. In some embodiments, the arc angle $\alpha_{260}$ is between 40° and 70°.

In some embodiments, the second set 264 of recesses 260 has the same number of recesses 260 and the same arrangement of recesses 260 as the first set 262. In the illustrated embodiment, the second set 264 of recesses 260 includes three of the recesses 260 and three of the spacing portions 286. In some embodiments, the recesses 260 of the first set 262 of recesses 260 and the recesses 260 of the second set 264 recesses 260 are circumferentially aligned. For example, a first recess of the first set 262 of recesses 260 is circumferentially aligned with a first recess of the second set 264 but offset in the axial direction. Alternatively, the first set 262 of recesses 260 and the second set 264 of recesses 260 may be circumferentially off-set. In some embodiments, the first set 262 of recesses 260 includes a different number of recesses 260, more or less, than the number of recesses 260 in the second set 264 of recesses 260.

The number of recesses 260, in the first set 262 and second set 264, and the radial arrangement of the recesses 260 may be selected based on characteristics of the driveshaft 104 and/or the compressor operational parameters, such as rotational speed, driveshaft diameter $D_{254}$, and compressor load. Furthermore, the recess arc length $L_{arc}$ may be selected based upon the number of recesses 260 and circumferential position of the recesses 260. For example, in some embodiments, the first set 262 and the second set 264 of recesses 260 may include four, five, and/or six of the recesses 260. Additionally, and/or alternatively, the shape and dimension, of recesses 260 may be selected based on, at least in part, on operating conditions of the compressor. In some embodiments, the arc length L. and the axial length $L_{axial}$ are the same for all the recesses. In some embodiments, the recesses 260 of the first set 262 and the second set of recesses 260 have all of the same arc lengths L. and axial lengths $L_{axial}$.

Referring to FIG. 11, the trailing end 270 is planar and extends along the radial direction, e.g., the trailing end 270 is perpendicular to the longitudinal axis A. In some alternative embodiments, at least one of the leading end 272 and trailing end 270 may be arcuate and/or slanted, for example, relative to the radial direction.

The driveshaft 104, having the first set 262 and the second set 264 of recesses 260, may be used in combination with other bearing systems, standard/conventional foil bearings, bearings, and/or magnetic bearings. Furthermore, the driveshaft 104 may be incorporated with other types of compressors such as scroll compressors, screw compressors, and the like. The driveshaft 104 may also be used with other types of machinery.

The foil bearing assemblies 220, 222 and driveshaft 104 of the present disclosure may be used as part of a method of assembling a compressor, e.g., compressor 100. The assembly method includes mounting the bearing housing, bearing housings 200, 202, to the compressor housing 102 using the mounting structure 210 of the bearing housing as described above. The assembly method also includes inserting a foil bearing assembly, e.g., 220, 222, into the cylindrical bore 206 and connecting the foil bearing assembly to the bearing housing by cooperatively engaging a bearing retention feature of the foil bearing assembly with a bearing assembly locking feature to maintain the foil bearing assembly within the bearing housing at a fixed rotational position.

In some embodiments, connecting the foil bearing assembly to the bearing housing includes connecting a plurality of separate pad modules, each having a separate bearing retention feature, to the bearing housing. The method further includes inserting at least one foil retaining clip into a circumferential groove, not shown, formed within an inner surface of the cylindrical bore 206 to retain the foil bearing assembly in a fixed axial position with respect to the cylindrical bore 206. The method further includes inserting the driveshaft 104 within the foil bearing assembly such that the plurality of recesses 260 are axially aligned with the foil bearing assembly, and/or axially centered on the top foil layer 226.

In some embodiments, the method of assembly includes assembling the top foil layer 226 and the outer layer 224 by inserting the top foil layer 226 within an opening of the outer layer 224 and axially aligning the top foil layer 226 with the outer layer 224. In some embodiments, the method includes connecting the retention feature 230 of the top foil layer 226 with the groove 228 formed on the outer layer 224.

The method may further include forming the recesses 260 on the driveshaft 104. Forming the recess 260 may include machining, e.g., using a computer numerical control (CNC) machine, and/or machining tools, to form the recesses 260 on the driveshaft 104. In other embodiments, forming recess 260 on the driveshaft 104 includes using an etching process.

Embodiments of the systems and methods described achieve superior results as compared to prior systems and methods. In particular, the example foil bearing assemblies and the driveshaft including recesses that facilitate improved aerodynamic performance and improved development of the lubricating fluid surround the driveshaft. The recesses store fluid and encourage the buildup of a complete fluid layer surrounding the driveshaft. In particular, a volume of fluid is contained within each recess and radially inward from the top foil layer at any rotational speed of the driveshaft.

Example embodiments of systems and methods including the driveshaft, such as refrigerant compressors that incorporate the disclosed driveshaft and methods of assembling compressors that include the disclosed driveshaft, are described above in detail. The driveshaft systems and methods are not limited to the specific embodiments described herein, but rather, components of the system and methods may be used independently and separately from other components described herein. For example, the driveshaft described herein may be used in compressors other than refrigerant compressors, such as turbocharger compressors and the like. The driveshaft described herein may be used in other types of bearing assemblies, to encourage the development of a complete radial pressure profile between the driveshaft and the bearing assembly.

When introducing elements of the present disclosure or the embodiment(s) thereof, the articles "a", "an", "the" and "said" are intended to mean that there are one or more of the elements. The terms "comprising," "including," "containing," and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A bearing system comprising:
a sleeve including a radial inner surface defining a cylindrical bore; and
a foil bearing assembly positioned within the cylindrical bore of the sleeve, wherein the foil bearing assembly includes:
a top foil layer; and
an outer layer positioned between the top foil layer and the radial inner surface; and
a driveshaft including a recess axially aligned with the top foil layer, the recess defines a cavity having a volume, the recess includes a leading end at a first circumferential position and a trailing end at a second circumferential position, wherein the volume of the cavity decreases from the leading end to the trailing end.

2. The bearing system of claim 1, wherein the recess includes a recess depth that is greatest at the leading end.

3. The bearing system of claim 1, wherein the leading end includes a first axial length and the trailing end includes a second axial length, wherein the first axial length is longer than the second axial length.

4. The bearing system of claim 1, wherein the recess includes a recess depth that decreases from the leading end to the trailing end, wherein the recess depth at the trailing end is zero.

5. The bearing system of claim 4, wherein the driveshaft includes three of the recesses arranged in a radially symmetric pattern, wherein each of the recesses include a recess arc angle α between the leading end and the trailing end, wherein the recess arc angle α is between 50° and 60°.

6. The bearing system of claim 1, wherein the driveshaft includes a plurality of the recesses arranged in a radially symmetric pattern about a rotational axis of the driveshaft.

7. The bearing system of claim 1, wherein the driveshaft includes a first portion and an opposing second portion that is axially offset from the first portion, wherein the driveshaft further comprises a first set including at least one of the recess formed at the first portion and a second set including at least one of the recess formed at the second portion.

8. The bearing system of claim 7, wherein the first set includes a plurality of the recess arranged in a radially symmetric pattern, and the second set includes the same number of the recess as the first set, and wherein the second set are arranged in a radially symmetric pattern that is the same as the radially symmetric pattern of the first set.

9. The bearing system of claim 1, wherein the recess has a base surface extending between the leading end and the trailing end, wherein the base surface is arched and has a radius of curvature that is less than a radius of curvature of an outer surface of the driveshaft.

10. A compressor comprising:
a compressor housing;
a bearing housing mounted to the compressor housing; and
a bearing system supported by the bearing housing, the bearing system comprising:

a sleeve including a radial inner surface defining a cylindrical bore; and a foil bearing assembly positioned within the cylindrical bore of the sleeve, wherein the foil bearing assembly includes:

a top foil layer; and an outer layer positioned between the top foil layer and the radial inner surface; and a driveshaft including a recess axially aligned with the top foil layer, the recess defines a cavity having a volume, the recess includes a leading end at a first circumferential position and a trailing end at a second circumferential position, wherein the volume of the cavity decreases from the leading end to the trailing end.

11. The compressor of claim 10, wherein the recess includes a recess depth that is greatest at the leading end.

12. The compressor of claim 10, wherein the leading end includes a first axial length and the trailing end includes a second axial length, wherein the first axial length is longer than the second axial length.

13. The compressor of claim 10, wherein the recess includes a recess depth that decreases from the leading end to the trailing end, wherein the recess depth at the trailing end is zero.

14. The compressor of claim 13, wherein the driveshaft includes three of the recesses arranged in a radially symmetric pattern, wherein each of the three recesses include a recess arc angle $\alpha$ between the leading end and the trailing end, wherein the recess arc angle is a between 50° and 60°.

15. The compressor of claim 10, wherein the driveshaft includes a plurality of the recesses arranged in a radially symmetric pattern about a rotational axis of the driveshaft.

16. The compressor of claim 10, wherein the driveshaft includes a first portion and an opposing second portion that is axially offset from the first portion, wherein the driveshaft further comprises a first set of at least one of the recess formed at the first portion and a second set of at least one of the recess formed at the second portion.

17. The compressor of claim 16, wherein the first set includes a plurality of recesses arranged in a radially symmetric pattern, and the second set includes the same number of recesses as the first set, and wherein the second set are arranged in a radially symmetric pattern that is the same as the radially symmetric pattern of the first set.

18. The compressor of claim 16, wherein the first set includes a plurality of the recesses arranged in a radially symmetric pattern, and the second set includes a different number of the recesses as the first set, and wherein the second set are arranged in a radially symmetric pattern.

19. The compressor of claim 10, wherein the recess has a base surface extending between the leading end and the trailing end, wherein the base surface is arched and has a radius of curvature that is the same as a radius of curvature of an outer surface of the driveshaft.

* * * * *